May 23, 1961  H. KRAPPATSCH  2,985,061
COLOR TEMPERATURE METER
Filed Jan. 15, 1957  3 Sheets-Sheet 1
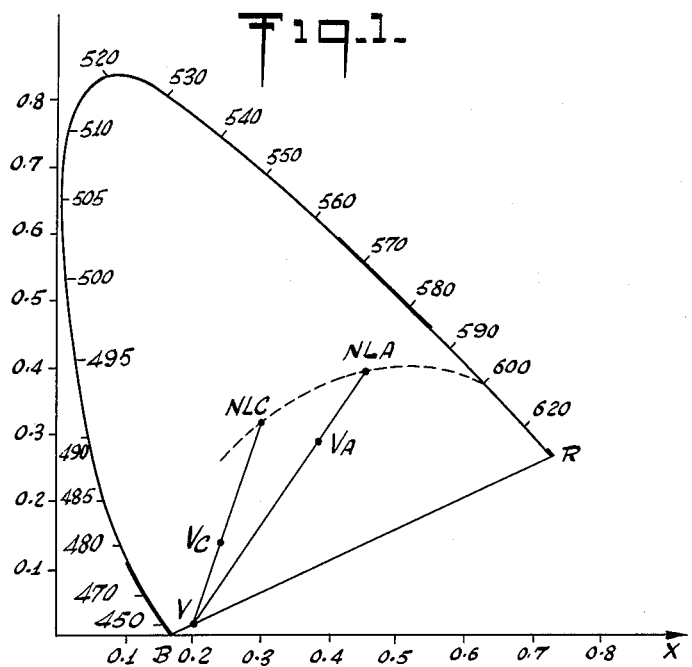
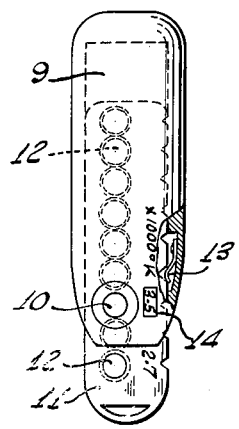
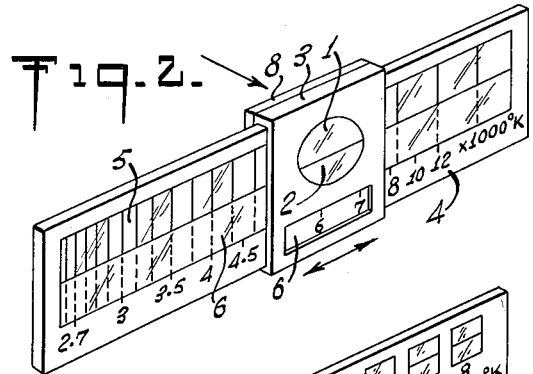
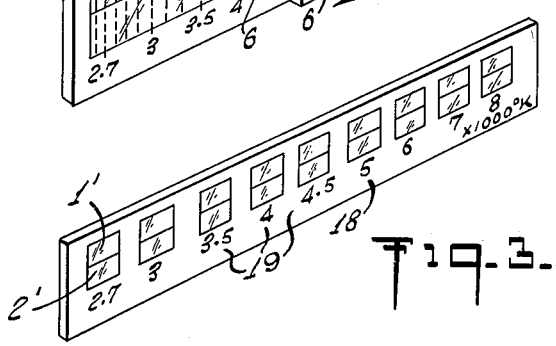
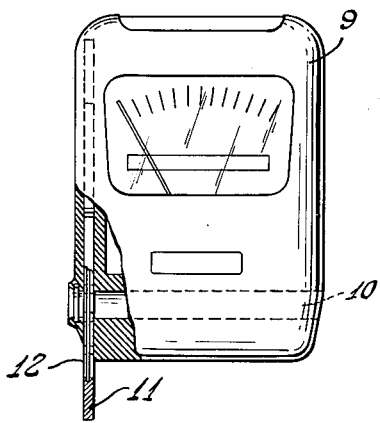
INVENTOR
HERBERT KRAPPATSCH
BY
Nolte & Nolte
ATTORNEYS

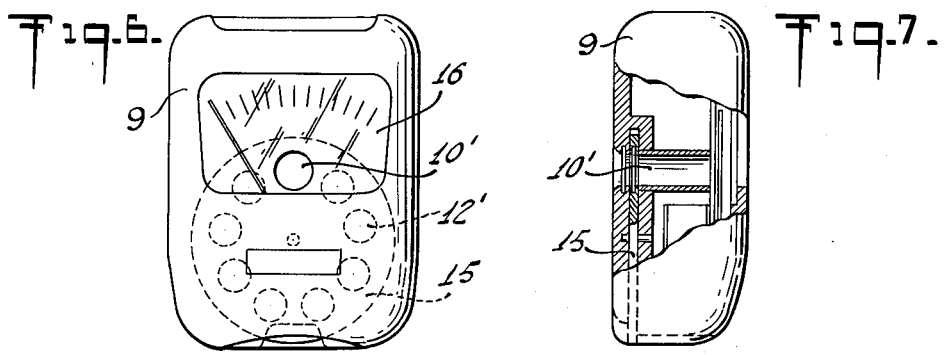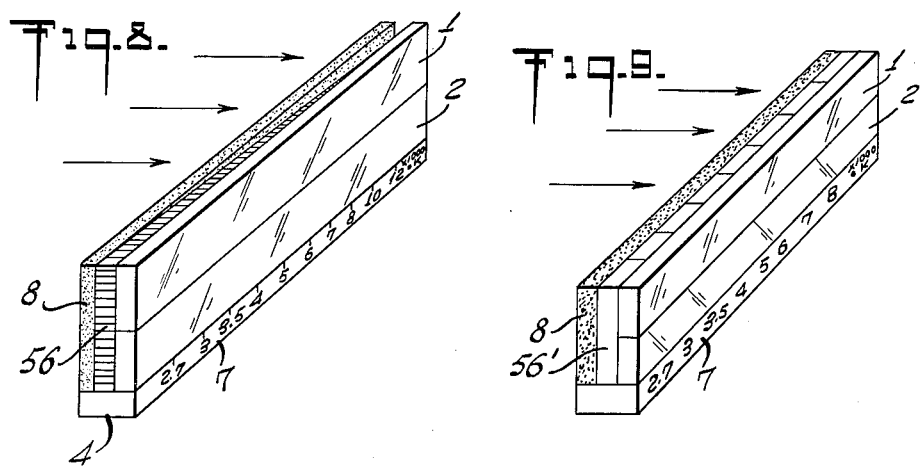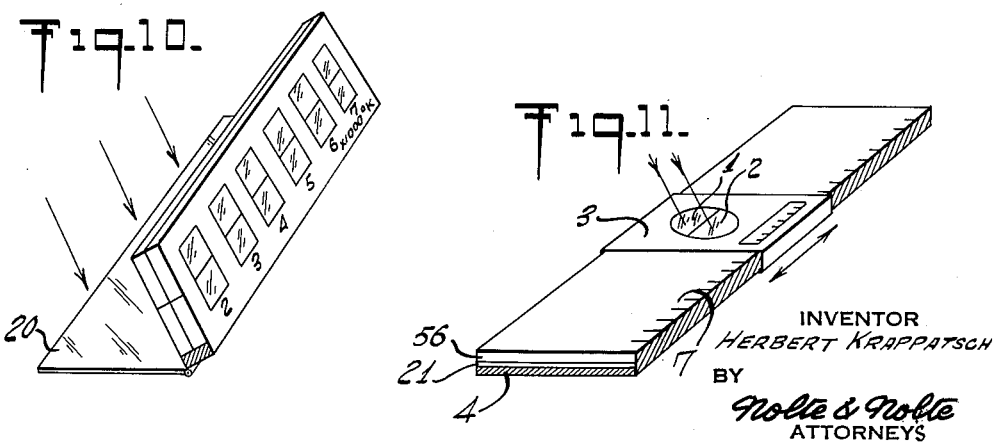

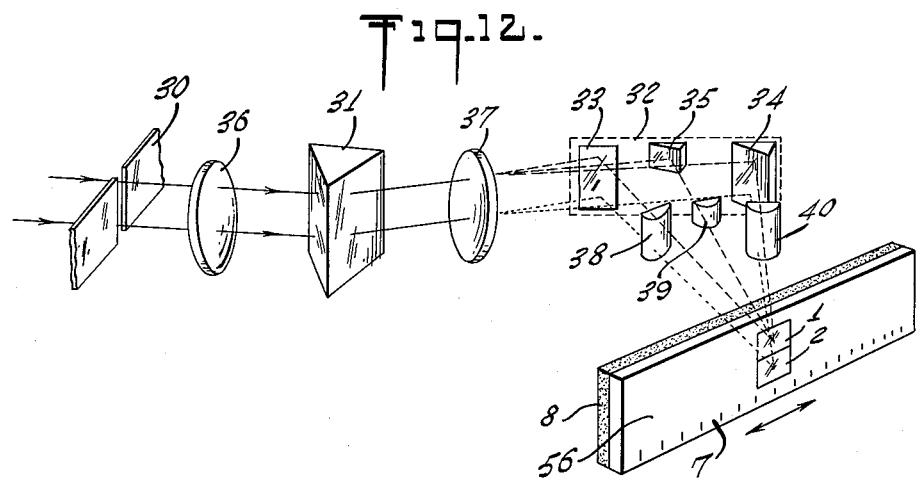
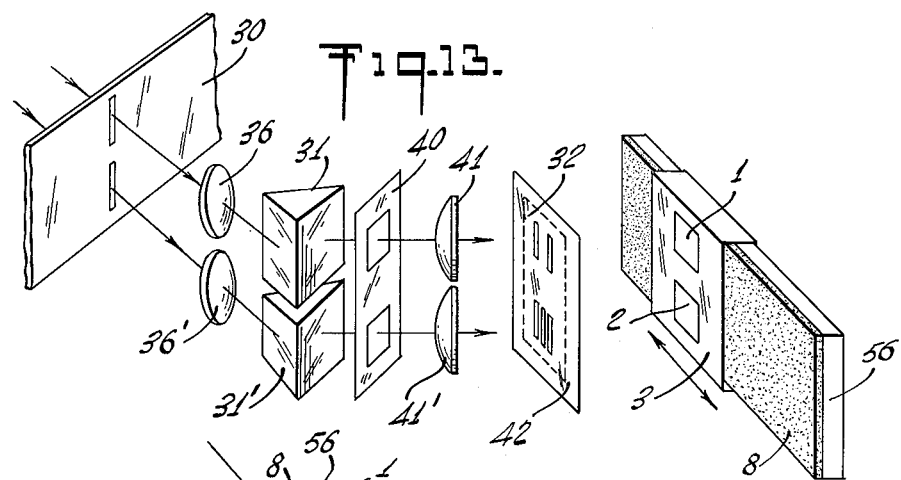
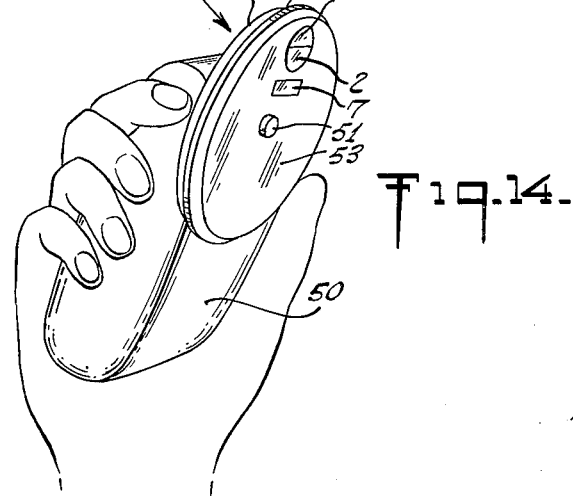

United States Patent Office 2,985,061
Patented May 23, 1961

2,985,061

COLOR TEMPERATURE METER

Herbert Krappatsch, Erlangen, Germany, assignor to P. Gossen & Co., G.m.b.H., Erlangen, Germany Filed Jan. 15, 1957, Ser. No. 634,289

Claims priority, application Germany Jan. 28, 1956

14 Claims. (Cl. 88—22.5)

This invention relates to optical testing instruments, and more specifically to a color temperature meter.

Purely optical color temperature meters are known, which operate for example on the following principle:

Two separate light beams are provided from a source of light to be measured. One of these light beams serves as a comparison beam and is taken from a relatively narrow spectral range, whereas the other light beam serves as a measuring beam and is obtained from two spectral ranges which lie in the visible spectrum to the left and the right, respectively, of the above-mentioned narrow spectral range of the comparison beam. The measuring and comparison beams are compared with each other as regards the color sensation which they cause in the eye. By interposing color-sensation changing means in one of the two beams, a substantial identity of the color sensation produced by the measuring and comparison beams is attained, the extent of the change in color necessary for this purpose serving as the measuring factor for the color temperature.

Thus, if, for example, a narrow spectral range around about 590 millimicrons is chosen as a comparison beam and a beam separated out from the green and red range of the visible spectrum as a measuring beam, the comparison beam, independently of the color temperature, causes an orange-yellow color sensation, whereas the measuring beam produces a color sensation which changes according to the color temperature, because at high temperatures the green rays determine the color sensation and at low color temperatures the red rays. The color sensation of the measuring beam consequently varies depending upon the color temperature from green through yellow and orange to red. By a suitable choice of the measuring and comparison beams, the color sensations produced thereby are identical at a certain color temperature. By changing one or both beams to a suitable extent, such an identity of the color sensations between the measuring and comparison beams can also be attained for other color temperatures.

According to this known principle, however, only such color temperature meters can be constructed in which the two spectral ranges, forming the measuring beam, are relatively close together, since it is only in this case that a narrow radiation range can be found within the visible spectrum that can serve as a comparison beam which causes, at a certain color temperature, a color sensation identical with that produced by the measuring beam. Consequently, it is similarly impossible to form the measuring beam from blue and red rays, because the color sensation produced by these rays shifts, at continually falling color temperatures, from blue through purple to red, and the visible spectrum does not include any purple color.

On the other hand, however, such a measuring beam composed of red and blue rays is particularly useful, since blue and red are located at the two ends of the visible spectral range and consequently the change in the ratio of the energies occurring in the two respective spectral ranges is particularly significant.

One of the principal objects of the present invention is to provide an efficient method of determining the color temperature of a light source, and apparatus for carrying out that method; which apparatus is particularly useful as a component of an exposure meter, of a container for front filter attachments or the like; contrary to the known methods and apparatus of the kind mentioned, in the method and apparatus according to the invention one of two beams serving as a measuring beam, is separated out substantially from the short wave (blue) spectral range and the long wave (red) spectral range, whereas the other beam serving as a comparison beam, contains not only short wave and long wave rays but also rays from the range between about 560 and 590 millimicrons.

Other objects and advantages of the invention will be apparent from the description set out below when read in connection with the accompanying drawings in which several preferred embodiments of the invention are illustrated by way for example.

In these drawings:

Fig. 1 is a chromaticity diagram illustrating the operation of the measuring method according to the invention;

Fig. 2 is a perspective view of a color temperature meter according to the invention;

Fig. 3 shows in a similar perspective view an arrangement having nine pairs of fields with color filters;

Fig. 4 is a front elevational view of a measuring apparatus combined with a photo-electric exposure meter, the view being partly broken away and partly in section;

Fig. 5 is a side elevational view of Fig. 4;

Fig. 6 is a front elevational view of a modified construction of a combined color measuring and photo-electric exposure meter;

Fig. 7 is a side elevational view of Fig. 6, the view being partly broken away and partly in section;

Fig. 8 is a perspective view of another embodiment of the color temperature meter of the invention;

Fig. 9 is a perspective view of a modified form of the meter of Fig. 8;

Fig. 10 is a perspective view of a modification of the arrangement of Fig. 3;

Fig. 11 is a perspective view of a modification of the meter of Fig. 2;

Fig. 12 is an exploded view of a color temperature meter of the invention using prisms for selection of spectral ranges;

Fig. 13 is an exploded view of a modified form of the meter of Fig. 12, and;

Fig. 14 is a perspective view of a color temperature meter of the invention combined with a container for front-filter attachments.

In order to explain the operation of the measuring method according to the invention, reference is made to Fig. 1 which shows a chromicity diagram with the abscissa and the ordinate in rectangular arrangement. The abscissa indicates chromaticity coordinate $x$ and the ordinate chromaticity coordinate $y$. In the coordinate scheme the spectrum locus is traced which produces a curve from B(lue) through G(reen) to R(ed), the actual wave lengths being indicated alongside of the curve. The straight line connecting B and R is the "purple line" on which the purple colors lie which do not occur in the spectrum. The closed curve path includes, amongst others, the color positions of standard illuminants A and C which are designated by NLA and NLC.

In the case of illumination with standard illuminant A which corresponds to a color temperature of 2850° K. (incandescent lamp light) the point designated NLA is the achromatic point. Similarly, point NLC is the achromatic point for the standard illuminant C (about 6500° K.). Color positions of types of light having other color temperatures are located on the dashed curve.

According to the invention, a measuring beam and a comparison beam are used. The measuring beam which is composed substantially of red and blue rays changes, as regards the color sensation, very considerably with the color temperature. The higher the latter becomes, the more blue said measuring beam appears. The comparison beam, on the other hand, contains in addition to red and blue also strong rays from the orange-yellow range. Such a comparison beam is, for example, composed of rays from the following three spectral ranges, which are emphasized in Fig. 1 by reinforcements of the respective curve portions.

(1) From the end of the short wave spectrum to 475 millimicrons,
(2) 565 to 585 millimicrons, and
(3) 655 millimicrons to the end of the long wave spectrum.

The color positions of the comparison beam at NLA and NLC, respectively, are calculated according to German DIN Standard 5033, and are the points designated $V_A$ and $V_C$ in Fig. 1. If the point $V_A$, for example, is connected with NLA by a straight line, the point V is obtained as the point of intersection with the purple line. If, in addition, $V_C$ is connected with NLC, another point is obtained as the point of intersection with the purple line, which is located so close to V that it can be described as coinciding therewith. This means, however, that the comparison beam chosen by way of example at NLA appears in the same color as at NLC. The color of the comparison beam is therefore practically independent of the color temperature.

With the substantially constant color of the comparison beam is now matched the color of the measuring beam by changing the ratio of the red and blue rays contained therein. For this purpose a color wedge shiftable transversely to the ray path of the measuring beam can, for example, be used. The shifting of the color wedge then becomes a measure for the color temperature. Likewise, the comparison beam can be matched with the measuring beam or the two beams can be so changed that they become chromatically identical.

A color wedge for matching the measuring beam with the comparison beam will be so colored that it possesses a different absorption in the red spectral range than in the blue. For this purpose, for example, a coloring material is employed which, as regards the spectral transmissivity, corresponds to the known filters which are placed in front of a source of light in order to change the color temperature thereof. Such a coloring material can, in principle, also be used when the color wedge is to serve for simultaneously changing the measuring and the comparison beams. As, however, an undesirable weakening of the comparison beam is obtained thereby, it is advisable, in this instance, to use a coloring material which also absorbs red and blue to a different extent, and in addition thereto has a possibly low absorption in the spectral range from 560 to 590 millimicrons.

If different color wedges are used for the measuring and the comparison beams, a green wedge can, for example, be used for the measuring beam, having a red absorption differing from its blue absorption, and a grey wedge for the comparison beam, which changes the brightness thereof. Such an arrangement is hereinafter described with reference to one form of construction.

Fig. 2 shows a possible embodiment of a color temperature meter for carrying out the method described. The temperature beam to be measured enters from the left in the direction of the arrow and can be viewed through two neighboring measuring fields 1 and 2 arranged adjacent each other in a sleeve or carrier means 3 slidable on a frame or carrier 4 passing therethrough. Each of the two fields has a color filter or color separating means. Field 1 only allows the passage of the measuring beam while the comparison beam passes through field 2. The color of the measuring and the comparison beams will be changed by moving the sleeve 3 relative to the frame 4 in which two color wedges 5 and 6 or a single color wedge 5, 6 are located, until chromatic identity has been established in the fields 1 and 2. The extent to which the sleeve 3 has been shifted in order to obtain identity in color is read on a scale 7 provided on the frame 4. The scale 7 can be calibrated in color temperatures (° K. or Mired), or directly in filter designations for color photography.

To exclude measuring errors which may be caused by a colored background, a diffusion means such as an opal or frosted glass disk 8 is so arranged on the sleeve 3 that the light to be measured impinges upon said disk before it passes through the color wedges 5, 6 and the fields 1, 2. This diffusion means can, however, also be omitted, in which case a surface with a high reflection coefficient which is essentially constant throughout the entire visible spectrum, and preferably a dull white surface is sighted at. This surface may also be applied to a member hingedly or otherwise fixed on the apparatus itself. It is to be positioned so that it is lighted by the source which is to be measured and is sighted at by the eye looking through the filters.

Furthermore, it is also possible to use, instead of two color wedges 5 and 6, a single wedge which changes the color of both beams. The color separation of the beams can likewise be accomplished without color filters, in that the radiation of the source of light passes through a prism and the desired spectral ranges are screened from the spectrum thrown by means of mirrors or slotted diaphragms, and are conducted to the neighboring fields. In the case of a color temperature meter constructed in the manner described, ordinary means for facilitating manipulation, improving visibility, and the like can be applied; for example, the shifting of the color wedge or wedges can be accomplished by means of a toothed gear; a viewing magnifying glass can be fitted in front of the two neighboring fields to be compared; the color wedges may be formed as circular wedges; or a weak counter wedge may be provided in a viewing window so as to obtain a uniform coloring of the two comparison fields.

The color temperature meter shown in and described with reference to Fig. 2 can be modified in such a manner that several pairs of neighboring fields are provided, each pair of fields showing a substantially chromatic identity of its two fields at a certain color temperature characteristics. Such an arrangement is obtained, for example, if the fields provided with color filters extend over the full length of one or two wedges. From the surface thus produced and composed of two superposed strips, several pairs of fields are screened out by means of one or several opaque masks so that each pair of fields only shows the same color in its neighboring fields at a certain particular color temperature. At each of these pairs of fields the corresponding color temperature value or a value related thereto is inscribed. The pairs of fields may also be arranged in the form of a circle or arc on a rigid or rotary disk.

Fig. 3 shows such an arrangement with nine pairs of fields 1', 2' arranged in a straight line within an opaque mask 18. Instead of the color wedge or wedges being located behind the fields 1', 2' a color filter may be arranged behind each field or pair of fields, which filter has the same color as the wedge had behind the field in question; thus a uniform coloring of the fields is obtained.

The above described arrangement allows the determination of the color temperature even without said opaque masks. In this case that spot is sought on the two superimposed strips where the upper and the lower strips best correspond in color; subsequently the color temperature is read on a scale 19 arranged under the color strips.

The color temperature meter according to the invention can be equipped for reading of incident light instead of through reading of transmitted light, preferably with the aid of a mirror placed thereunder.

These further modifications of the color temperature meter of the invention are illustrated in Figs. 8 to 13.

Fig. 8 shows a structurally very simple embodiment of the invention comprising a frame or carrier 4 on which are mounted two color filters 1, 2 of the aforedescribed kind. A single color wedge 56 is arranged between the filters 1, 2 and a sheet of frosted glass 8. Light beams the color temperature of which is to be measured enter the device through the frosted glass 8 in the direction of the arrows. Two different bands of color, varying longitudinally from end to end on color filters 1 and 2, respectively, are produced. A scale 7 in suitable units is arranged on frame 4 adjacent color 1, 2 and the color temperature of the light beam is read from scale 7 at the point of identical color on filters 1 and 2.

Fig. 9 shows an arrangement similar to that of Fig. 8, but having a series 56' of eight graded filters arranged between filters 1, 2 and frosted glass 8 on frame 4 instead of a continuous color wedge. Instead of continuously varying colors, eight fields of color varying in steps from end to end on color filters 1 and 2 are observed. Color temperature of the light beam passing through the device is read from scale 7 near the area of closest color agreement between filters 1 and 2.

Fig. 10 shows a color temperature meter of the type illustrated in Fig. 3 in which the light entering the meter is diffused by a dull white surface of good reflectivity formed on a flap 20 which is hinged to the side of the instrument. Light falling on the white surface of flap 20 in the direction of the arrows is reflected into the meter which operates in the same manner as described above in connection with Fig. 3.

The color temperature meter of Fig. 11 is generally similar in structure and operation to that of Fig. 2 but is arranged for use with incident light rather than transmitted light. A mirror 21 is placed under the color wedge 56 and supported by a frame 4. The sleeve 3 carries filters 1 and 2 from which the color temperature is read in conjunction with scale 7 as described in Fig. 2. A diffusion means such as a frosted glass may be placed between filters 1, 2 and color wedge 56, but the same purpose can be achieved by slightly roughening the surface of color wedge 56.

Embodiments of the color temperature meter of the invention employing a prism instead of filters for color separation together with the necessary mirrors, slotted shields and lenses which cooperate in a well known manner to screen the desired spectral ranges of the measuring beam and the comparison beam for determination of the color temperature by comparison of the color of adjacent measuring fields, are shown in Figs. 12 and 13.

Fig. 12 is an exploded view of a color temperature meter of the invention using a prism instead of a filter for separating spectral ranges. Light enters the device in the direction of the arrows through slotted shield 30 and prism 31 which projects a spectrum 32. Mirrors 33 and 34 are arranged at the red and blue end respectively of the spectrum 32 and extend over the full height thereof. A mirror 35 is arranged in the spectrum 32 to reflect light of wavelengths between 565 and 590 mµ and extends only over one half of the height of spectrum 32. Lenses 36 and 37 arranged before and after the prism 31 assist in a well-known manner in the production of spectrum 32. Cylindrical lenses 38, 39 and 40 concentrate the beams of light projected from mirrors 33, 34, and 35, respectively, in narrow portions of a light diffusing sheet 8 of frosted glass from which they are transmitted to a superimposed color wedge 56. Since in the arrangement shown the lower part of the illuminated portion of color wedge 56 receives light from mirrors 33 and 34 only, whereas the upper part additionally receives light from mirror 35, two lighted fields 1, 2 appear on the surface of the color wedge 56. To read color temperature from this device, color wedge 56 is moved longitudinally in the direction of the double arrow until the color of fields 1 and 2 is identical. The color temperature may then be read from the scale 7.

The arrangement illustrated in Fig. 13 is based on the same operating principle as that shown in Fig. 12, but spectral ranges are screened from the full spectrum by a slotted diaphragm instead of mirrors. Two beams are selected by a slotted shield 30 from the light the color temperature of which is to be determined and pass through lenses 36, 36', prims 31, 31', two openings in a diaphragm 40 and spherical lenses 41, 41', whereby a spectrum 32 is projected on a diaphragm 42 in which slots for passage of light of narrow spectral ranges are formed on two levels. Light from the red and blue ends of the spectrum is passed on both levels, light of wavelengths between 565 and 590 millimicrons is additionally passed on one level only. The light beams passing through diaphragm 42 combine to form on a light-diffusing frosted glass 8 two colored illuminated fields defined by openings 1, 2 in a sleeve 3 in which a color wedge 56 is slidably mounted. The device operates in the same manner as that illustrated in Fig. 12.

As optical color temperature meters of the type described are required primarily for ascertaining which conversion filters are necessary for color photography, it is advisable to combine such a measuring device primarily with a photo-electric exposure meter. Examples of such constructions of photo-electric exposure meters in which color temperatures meters according to the invention are built in, are illustrated in Figs. 4 to 7.

In the construction shown in Figs. 4 and 5, a passage or channel 10, through which comparison fields 12 arranged on a slide 11 can be viewed, is provided in a housing 9 of an exposure meter. The slide 11 is held in measuring position by a catch 13; the corresponding color temperature can be read in a window 14.

Figs. 6 and 7 show a modified form of construction in which individual comparison fields 12' are arranged on a rotary disk 15 and can be viewed through a passage or channel 10', with an eyepiece located below a reading scale 16 forming part of the exposure meter.

In the examples shown in Figs. 4 to 7, the type of the incorporated color temperature meter can be either that shown in Fig. 2 or that of Fig. 3. If it is a question of a construction with underlaid mirror for surface viewing, this apparatus can be fitted as a flap on an exposure meter.

In the same or a similar manner the color temperature meter can also be combined with a container for front-filter attachments, as shown in Fig. 14 in which a container 50 for front-filter attachments and the like is illustrated on which a color temperature meter of the invention is mounted. The meter comprises an opal glass disk 8, a circular color wedge 56 rotatably mounted on a stud 51 fastened to container 50, and a stationary opaque disk 53 having color filters 1 and 2 of the above described type mounted therein adjacent each other, and an opening through which a scale 7 mounted on color wedge 56 can be read. The meter is seen in operating position with the beam of light the color temperature of which is to be measured falling on the diffusing disk 8 in the direction of the arrow. The color wedge 56 which is provided with a knurled edge is rotated manually until the same color appears in fields 1 and 2. The color temperature of the light beam can then be read from scale 7.

From the above detailed description of the invention, it is believed that the construction will be fully apparent, and while there are herein shown and described several preferred embodiments of the invention, it is nevertheless to be understood that minor changes may be made therein without departing from the spirit and scope of the invention as claimed.

I claim:

1. A device for measuring the color temperature of a light source, comprising carrier means, first and second color separating means mounted adjacent each other on said carrier means for respective passage of light beams from said light source, said first and second color separating means being of materials to selectively transmit light of wavelengths corresponding substantially to the longest and shortest wavelengths of the visible spectrum, said second color separating means being additionally adapted to transmit light of a wavelength of substantially 560 to 590 millimicrons, said first and second color separating means having the same color for one color temperature only, and color wedge means mounted on said carrier means and interposed in the paths of said light beams passing through said color separating means, said color wedge means having different absorption properties for light of wavelengths corresponding substantially to the longest and shortest wavelengths of the visible spectrum and being capable of adjusting the red to blue ratio of the light to be measured to the same value as is present in light having that color temperature for which said first and second color separating means have the same color, and a scale on said carrier means extending over the length of said color wedge means, said color wedge means and said carrier means being movable relative to each other, whereby upon relative movement between said carrier means and said color wedge means, different portions of said color wedge means will be placed into register with said color separating means until color identity between said two color separating means has been obtained.

2. A device as set forth in claim 1, wherein said color wedge means comprises a plurality of color separating means having different absorption properties for light of wavelengths corresponding substantially to the longest and shortest wavelengths of the visible spectrum, and being arranged in sequence of increasing absorption of said light, each member of said sequence covering a portion of said first color separating means as well as a portion of said second color separating means and each member of said sequence being marked by a scale number on said carrier means.

3. A device for measuring the color temperature of a light source, comprising carrier means, first and second color separating means mounted adjacent each other on said carrier means for respective passage of light beams from said light source, said first and second color separating means being of materials to selectively transmit light of wavelengths corresponding substantially to the longest and shortest wavelengths of the visible spectrum, said second color separating means being additionally adapted to transmit light of wavelengths of substantially 560 to 590 millimicrons, said first and second color separating means having the same color for one temperature only, a first and a second color wedge means in mutually fixed spatial relationship and interposed in the paths of said light beams passing through said first and second color separating means respectively, said first color wedge means cooperating with said first color separating means and having different absorption properties for light of wavelengths corresponding substantially to the longest and shortest wavelengths of the visible spectrum and being capable of adjusting the red to blue ratio of the light to be measured to the same value as is present in light having that color temperature for which said first and second color separating means have the same color, said second color wedge means cooperating with said second color separating means having an absorption substantially alike for all wavelengths of the visible spectrum, and a scale on said carrier means extending over the length of said color wedge means, said color wedge means and said carrier means being movable relative to each other whereby upon relative movement between said carrier means and said color wedge means different portions of said color wedge means will be placed into register with the color separating means until color identity between said two color separating means has been obtained.

4. A device as set forth in claim 3 wherein said first and second color separating means are colored optical filters, wherein said first and second color wedges have one respective surface in substantially a common plane, said first and second filters being superimposed on and substantially coextensive with said first and second color wedge means respectively, and wherein said carrier comprises an opaque mask coextensive with said first and second filters and provided with a plurality of transparent openings which allow to see a series of fields each of which is divided into two halves by the line which separates said first color filter and color wedge from said second color filter and color wedge, each opening being marked by a scale number on said carrier means.

5. A device as set forth in claim 1, including light diffusing means mounted on said carrier means and interposed in the paths of said light beams between said light source and said color separating means.

6. A device as set forth in claim 1, wherein said color separating means comprises a prism and a mirror adapted to screen selected spectral ranges of the spectrum thrown by said prism.

7. A device as set forth in claim 1, wherein said color separating means comprises a prism and a slotted diaphragm adapted to screen selected spectral ranges of the spectrum thrown by said prism.

8. A device as set forth in claim 1, wherein said color separating means comprises a prism and a mirror and a slotted diaphragm adapted to screen selected spectral ranges of the spectrum thrown by said prism.

9. A device as set forth in claim 1, including a mirror, said color separating means and said color wedge means being superimposed on the surface of said mirror for reflection of said light beams passing through said color separating means and said color wedge means.

10. A device as set forth in claim 1, wherein said color wedge means and said color separating means are mounted on said carrier for relative translatory movement.

11. A device as set forth in claim 1, wherein said color separating means and said color wedge means are mounted on said carrier for relative rotary movement.

12. A device as set forth in claim 1, comprising an element hinged to said carrier and having a dull white reflecting surface adapted to be interposed by hinged movement of said element in the paths of said light beams passing through said color separating means and said color wedge means.

13. A device as set forth in claim 1, including a photoelectric light meter and forming a unitary structure with said light meter in a common housing.

14. A device as set forth in claim 1, including a filter attachment for the front lens of a photographic apparatus and forming a unitary structure with said attachment.

References Cited in the file of this patent

UNITED STATES PATENTS

| | | |
|---|---|---|
| 1,865,878 | Naeser | July 5, 1932 |
| 2,049,260 | Hase | July 28, 1936 |
| 2,218,253 | Weaver | Oct. 15, 1940 |
| 2,572,488 | Jagersberger | Oct. 23, 1951 |

FOREIGN PATENTS

| | | |
|---|---|---|
| 325,863 | Great Britain | Feb. 28, 1930 |
| 715,580 | France | Sept. 9, 1931 |